(12) United States Patent
Liu et al.

(10) Patent No.: US 7,572,165 B2
(45) Date of Patent: Aug. 11, 2009

(54) METHOD FOR MAKING A CARBON NANOTUBE-BASED FIELD EMISSION CATHODE DEVICE INCLUDING LAYER OF CONDUCTIVE GREASE

(75) Inventors: Peng Liu, Beijing (CN); Yang Wei, Beijing (CN); Lei-Mei Sheng, Beijing (CN); Liang Liu, Beijing (CN); Shou-Shan Fan, Beijing (CN); Zhao-Fu Hu, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 344 days.

(21) Appl. No.: 11/089,863

(22) Filed: Mar. 25, 2005

(65) Prior Publication Data

US 2005/0236951 A1    Oct. 27, 2005

(30) Foreign Application Priority Data

Apr. 22, 2004    (CN) .................. 2004 1 0027042

(51) Int. Cl.
 *H01J 9/04* (2006.01)
 *H01J 9/12* (2006.01)
(52) U.S. Cl. .......................... 445/51; 445/50
(58) Field of Classification Search ............ 313/310, 313/346 R, 495–497; 445/24, 50, 51; 997/932, 997/952
See application file for complete search history.

(56) References Cited

U.S. PATENT DOCUMENTS

| | | | |
|---|---|---|---|
| 6,097,138 A | 8/2000 | Nakamoto | |
| 6,440,761 B1 | 8/2002 | Choi | |
| 6,495,258 B1 | 12/2002 | Chen et al. | |
| 6,616,495 B1 | 9/2003 | Tsuboi | |
| 6,616,497 B1 | 9/2003 | Choi et al. | |
| 6,914,372 B1 * | 7/2005 | Akiyama et al. | 313/309 |
| 2004/0130510 A1 * | 7/2004 | Konishi et al. | 345/75.2 |
| 2004/0191698 A1 * | 9/2004 | Yagi et al. | 430/320 |
| 2005/0070657 A1 * | 3/2005 | Elkovitch et al. | 524/495 |
| 2005/0104506 A1 * | 5/2005 | Youh et al. | 313/496 |
| 2005/0236951 A1 * | 10/2005 | Liu et al. | 313/310 |
| 2005/0260120 A1 * | 11/2005 | Smalley et al. | 423/447.1 |

FOREIGN PATENT DOCUMENTS

JP    05194823    *    8/1993

OTHER PUBLICATIONS

Machine translation of JP 08-26164B.*

* cited by examiner

*Primary Examiner*—Toan Ton
*Assistant Examiner*—Bumsuk Won
(74) *Attorney, Agent, or Firm*—D. Austin Bonderer

(57) ABSTRACT

A preferred method for making a carbon nanotube-based field emission cathode device in accordance with the invention includes the following steps: preparing a solution having a solvent and a predetermined quantity of carbon nanotubes dispersed therein; providing a base with an electrode (101) formed thereon; forming a layer of conductive grease (102) on the base; distributing the solution on the layer of conductive grease, and forming a carbon nanotube layer (103) at least attached on the surface of the conductive grease after the solvent evaporates; and scratching the layer of conductive grease, in order to raise first ends of at least some of the carbon nanotubes from the conductive grease and thereby attain an effective carbon nanotube field emission cathode.

16 Claims, 6 Drawing Sheets

METHOD FOR MAKING A CARBON NANOTUBE-BASED FIELD EMISSION CATHODE DEVICE INCLUDING LAYER OF CONDUCTIVE GREASE

BACKGROUND OF THE INVENTION

1. Field of the Invention

The present invention relates to a method for making a field emission cathode device, and more particularly to a method for making a carbon nanotube-based field emission cathode device.

2. Prior Art

Carbon nanotubes are a novel carbonaceous material discovered by Iijima, a researcher of NEC corporation, in 1991. Relevant information was reported in an article by Iijima, entitled "Helical Microtubules of Graphitic Carbon" (Nature, Vol. 354, P56, 1991). Carbon nanotubes can transmit an extreme high electrical current and emit electrons at a very low voltage of less than 100 volts, which make it a very promising potential material for field emission applications.

Arc discharge is widely used in forming carbon nanotubes, but it is not suitable for mass production of carbon nanotubes at a low cost, and further more it's difficult to control a structure of carbon nanotube arrays by this method. To overcome these problems, chemical vapor deposition has been developed. Representative chemical vapor deposition methods include thermal chemical vapor deposition (CVD) (Appl. Phys. Lett. 67, 2477, 1995), microwave plasma-enhanced chemical vapor deposition (MPECVD) (App. Phys. Lett. 72, 3437, 1998), and ion beam irradiation (Appl. Phys. Lett. 69, 4174, 1996).

However, forming carbon nanotube arrays used for field emission has other difficulties. The carbon nanotubes formed by chemical vapor deposition methods usually twist at the top thereof, which reduces the efficiency of field emission. Consequently, a method for trimming the carbon nanotubes is necessary. Unfortunately the method for trimming the carbon nanotubes is usually complex or costly. Further more, chemical vapor deposition methods are unsuitable for making uniform and large-area field emission cathode.

Another method for making a carbon nanotube array for field emission includes the steps of printing a layer of grease or emulsion with a predetermined quantity of carbon nanotubes dispersed therein, and peeling off the layer of grease to expose the carbon nanotubes so that they can emit electrons. However, the step of peeling usually destroys the carbon nanotube array as well as the carbon nanotubes. Thus, another way for making a carbon nanotube array is desired.

U.S. Pat. No. 6,616,495, issued to Toshiyuki Tsuboi, discloses a method for forming a carbon nanotube film comprising the steps of preparing a suspension having a solvent and coarse carbon nanotubes dispersed therein, disposing a substrate in the suspension, the substrate having an exposed portion patterned into a predetermined shape, and depositing a carbon nanotube film on the exposed portion of the substrate by evaporating the solvent. The carbon nanotube film can be used for a field emission cathode directly.

However, in the carbon nanotube film almost all the carbon nanotubes lie on the substrate. Carbon nanotubes emit electrons only in an axial direction thereof. Thus the carbon nanotubes lied on the substrate is not beneficial to exert field emission feature of the carbon nanotubes. Therefore, an improved carbon nanotube-based field emission cathode device which can fully exert the field emission feature of the carbon nanotubes is desired.

SUMMARY OF THE INVENTION

Accordingly, an object of the present invention is to provide a method for making a carbon nanotube-based field emission cathode device which has an improved field emission efficiency.

Another object of the present invention is to provide a method for making a carbon nanotube-based field emission cathode device which is cost-efficient.

A further object of the present invention is to provide a carbon nanotube-based field emission cathode device which has an improved field emission efficiency.

In order to achieve the first and second object set out above, a preferred method for making a carbon nanotube-based field emission cathode device in accordance with the present invention comprises the following steps: preparing a solution having a solvent and a predetermined quantity of carbon nanotubes dispersed therein; providing a base with an electrode formed thereon; forming a layer of conductive grease on the base; distributing the solution on the layer of conductive grease to form a carbon nanotube layer on the conductive grease; and scratching the layer of conductive grease, for raising first ends of at least some of the carbon nanotubes from the conductive grease.

Preferably, the solution is distributed on the layer of conductive grease by a sprinkling process to form a carbon nanotube layer on the conductive grease.

Alternatively, the electrode is a metallic membrane overlaid on the base or a pattern of several parallel metallic strips set on the base.

In order to achieve the third object set out above, a preferred carbon nanotube-based field emission cathode device comprises: a base with en electrode formed thereon; a layer of conductive grease formed on the electrode; and a carbon nanotube layer formed on the layer of conductive grease; wherein the layer of conductive grease is scratching into grids, with first ends of at least some of the carbon nanotubes raise from the conductive grease.

Due to the scratching of the layer of conductive grease, first ends of at least some of the carbon nanotubes raise from the conductive grease and extend in more erect orientations. These carbon nanotubes can emit electrons to the anode more efficiently. In addition, due to the step of sprinkling, carbon nanotube-based field emission arrays with large areas can be obtained at a low cost. Furthermore, different designs of the electrode on the base result In different carbon nanotube-based field emission cathode devices, which are suitable for use in different field emission devices.

Other objects, advantages and novel features of the present invention will become more apparent from the following detailed description when taken in conjunction with the accompanying drawings, in which:

DETAILED DESCRIPTION OF THE INVENTION

Figure 1:
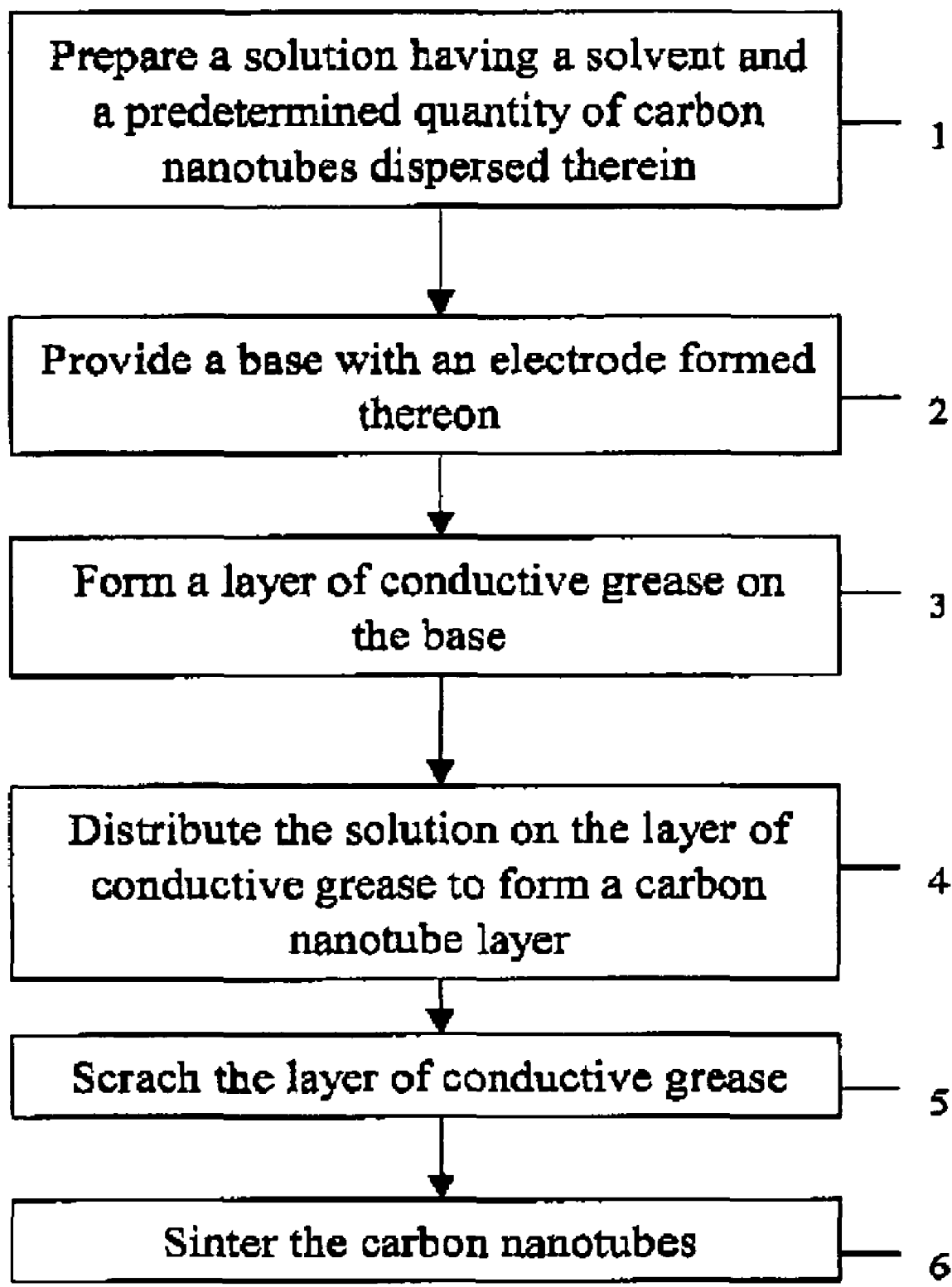
FIG. 1 is a flow chart of the preferred method for making a carbon nanotube-based field emission cathode device in accordance with the present invention.

A preferred method for making a carbon nanotube-based field emission cathode device in accordance with the present invention will be described below with reference to FIG. 1.

Step 1 is to prepare a solution having a solvent and a predetermined quantity of carbon nanotubes dispersed therein. The solvent is of a kind suitable for dispersing the carbon nanotubes, and can for example be 1,2-chloric ethane. The carbon nanotubes are formed by an arc discharge method or a chemical vapor deposition (CVD) method. A predetermined quantity of carbon nanotubes is put into the solvent, and the carbon nanotubes are dispersed by ultrasonic vibration or similar means, whereby the solution is prepared.

Step 2 is to provide a base with an electrode formed thereon. Generally, the base is a glass base. Other insulative materials similar to glass can also be used as the base. The electrode is made of any suitable conductive material known in the art.

Step 3 is to form a layer of conductive grease on the base. The conductive grease comprises metal powder, glass powder, and an organic agglutinin. The conductive grease is electrically conductive, and can adhere the carbon nanotubes.

Step 4 is to distribute the solution on the layer of conductive grease to form a carbon nanotube layer on the conductive grease. The solution prepared in step 1 is distributed by sprinkling it on the layer of conductive grease. When the solvent subsequently vaporizes, the carbon nanotube layer is formed on the conductive grease. Preferably, the base is heated while the solution is sprinkled, so that the solvent can vaporize rapidly. As a result, the solution is prevented from flowing unevenly, and the carbon nanotubes are distributed uniformly.

Step 5 is to simultaneously scratch the carbon nanotube layer and the layer of conductive grease, to make first ends of certain of the carbon nanotubes raise from the conductive grease. By a mechanical method, such as using a reamer, the layer of conductive grease is scratched lengthways and widthways, with part of the conductive grease being gouged out in parallel lines. Thus a regular array of ungouged grids is formed, with each grid having a plurality of carbon nanotubes thereat. On each grid, the first ends of at least some of the carbon nanotubes have less support than previously, because adjacent conductive grease has been removed. That is, the first ends of these carbon nanotubes are suspended in air. Furthermore, during the scratching process, molecular forces, such as van der Waal's forces, exist between the reamer and at least some of the carbon nanotubes. These forces operate to drag those carbon nanotubes up and make the first ends of these carbon nanotubes rise into more erect orientations. Thus a plurality of effective carbon nanotube field emitters is formed. The more such grids that are formed, the more effective field emitters that can be provided.

Step 6 is to sinter the carbon nanotubes in order to attaining a well-proportioned carbon nanotube field emission cathode. After step 5, an integral piece is obtained, which comprises the base, the electrode, the layer of conductive grease with multiple grids therein, and a layer of carbon nanotubes on the layer of conductive grease at the grids. The whole piece is placed in a vacuum or in an environment of argon or nitrogen gas, at a temperature of 350~600 degrees Centigrade for 20~60 minutes. This sinters the carbon nanotubes, and opposite second ends of the carbon nanotubes attach on the layer of conductive grease firmly.

Thus the carbon nanotube-based field emission cathode device attained by the present method has carbon nanotubes as effective field emitters without destroying the field emission arrays. The efficiency of field emission of the carbon nanotube-based field emission cathode device is improved. In addition, the step of sprinkling the solution to form the carbon nanotube layer enables a large size carbon nanotube-based field emission cathode device to be formed at low-cost.

Figure 2:
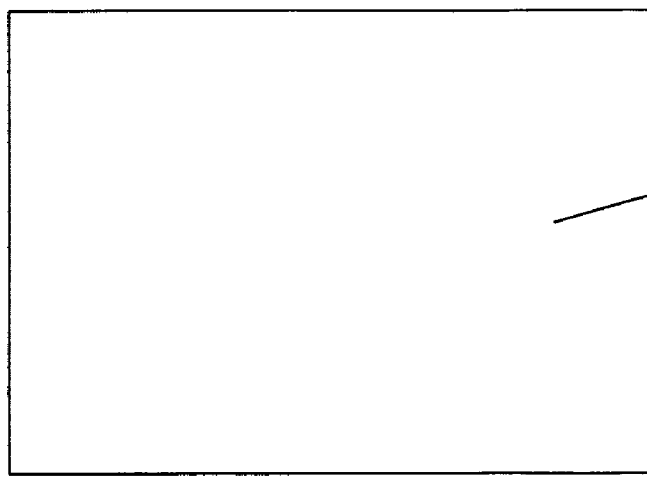
FIG. 2 is a schematic, planform view of a base with an electrode formed thereon according to a first embodiment of the present invention.
Figure 3:
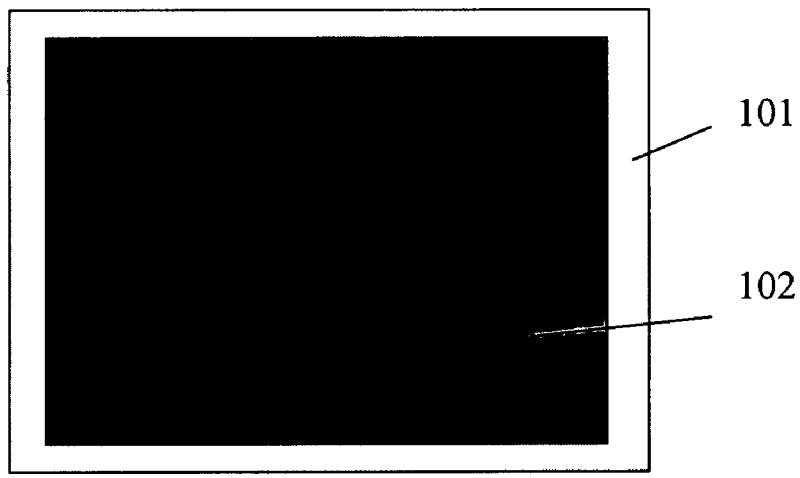
FIG. 3 is similar to FIG. 2, but showing a layer of conductive grease formed on the base.
Figure 4:
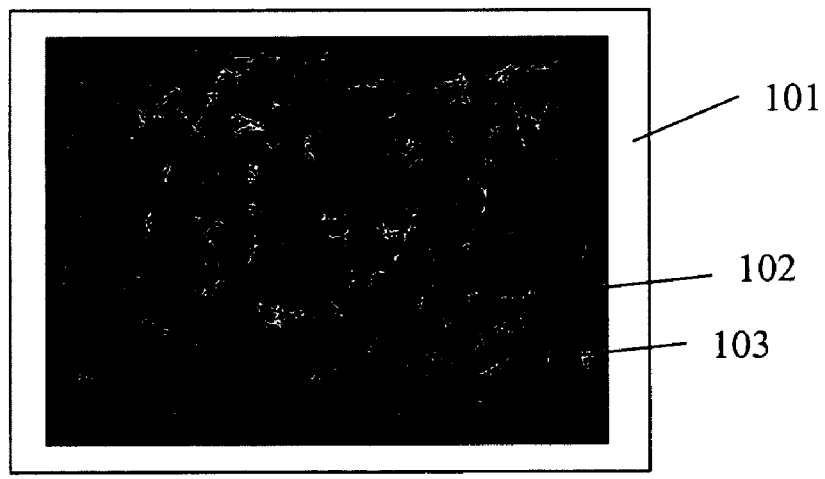
FIG. 4 is similar to FIG. 3, but showing a carbon nanotube layer formed on the layer of conductive grease.
Figure 5:
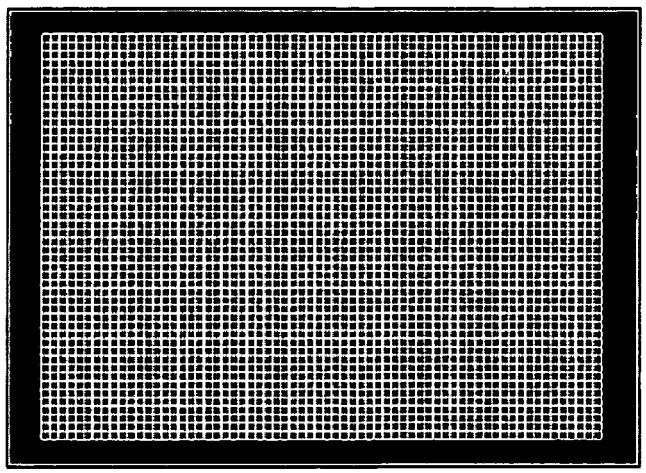
FIG. 5 is similar to FIG. 4, but showing the carbon nanotube layer after the carbon nanotube layer and the layer of conductive grease have been simultaneously scratched.

Referring to FIGS. 2 through 5, a first embodiment of the present invention is a method for making a carbon nanotube-based field emission cathode device that is usable as a common electron source. Referring to FIG. 2, a base with an electrode 101 formed thereon is provided. The electrode 101 is a metallic membrane overlaid on the base. Referring to FIG. 3, a layer of conductive grease 102 is printed on the base, so that the electrode 101 is sandwiched between the base and the layer of conductive grease 102. Referring to FIG. 4, a carbon nanotube layer 103 is formed on the layer of conductive grease 102. Referring to FIG. 5, the layer of conductive grease 102 and the carbon nanotube layer 103 are simultaneously scratched into a regular array of grids. The carbon nanotubes are then sintered to fasten their opposite second ends onto the layer of conductive cease 102, thereby providing the carbon nanotube-based field emission cathode device. This cathode device having the single membrane electrode 101 is suitable for use as a common electron source.

Referring to FIGS. 6 through 10, a second embodiment of the present application is a method for making a carbon nanotube-based field emission cathode device that can be used in a flat panel display device. The method comprises the following steps: preparing a solution having a solvent into which a predetermined quantity of carbon nanotubes is dispersed, and providing a base with an electrode pattern formed thereon; forming a layer of conductive grease on the base; distributing the solution on the layer of conductive grease to form a carbon nanotube layer on the conductive grease; scratching the layer of conductive grease in order to make first ends of certain of the carbon nanotubes raise from the conductive grease; wiping off conductive grease that is not located on the electrode pattern; and sintering the carbon nanotubes, thereby attaining an effective carbon nanotube field emission cathode.

Figure 6:
FIG. 6 is a schematic, planform view of a base having an electrode pattern formed thereon according to a second embodiment of the present invention.

Referring to FIG. 6, a base with an electrode pattern 201 formed thereon is provided. The electrode pattern 201 comprises parallel metallic strips set on the base. The electrode pattern 201 cooperates with a grid electrode to control pixels of a display.

Figure 7:
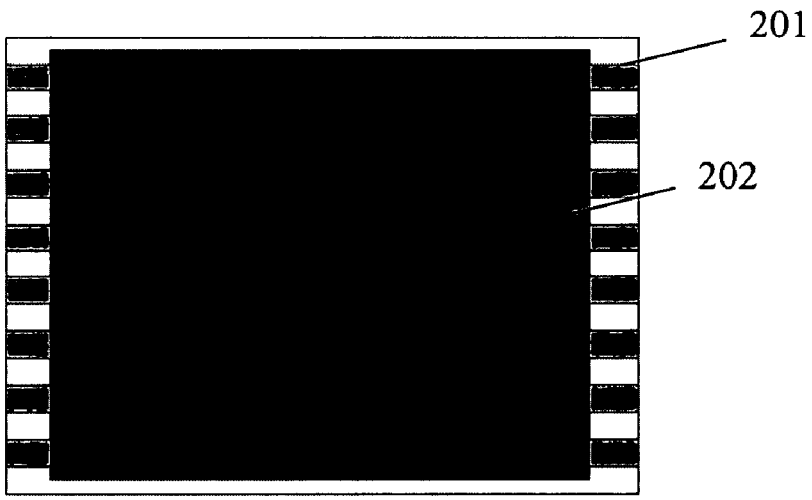
FIG. 7 is similar to FIG. 6, but showing a layer of conductive grease formed on the base.

Referring to FIG. 7, a layer of conductive grease 202 is printed on the base, so that the electrode pattern 201 is sandwiched between the base and the layer of conductive grease 202. Some conductive grease 202 is formed directly on the base, and other conductive grease 202 is formed directly on the electrode pattern 201.

Figure 8:
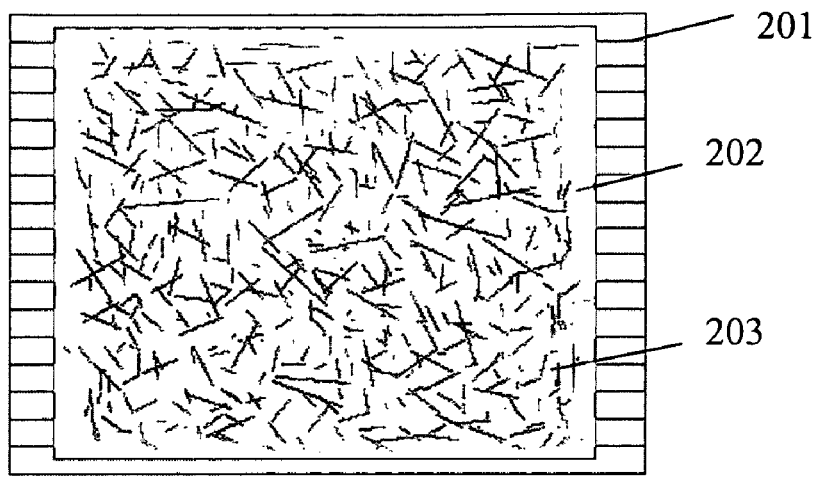
FIG. 8 is similar to FIG. 7, but showing a carbon nanotube layer formed on the layer of conductive grease.

Referring to FIG. 8, a carbon nanotube layer 203 is formed on the layer of conductive grease 202.

Figure 9:
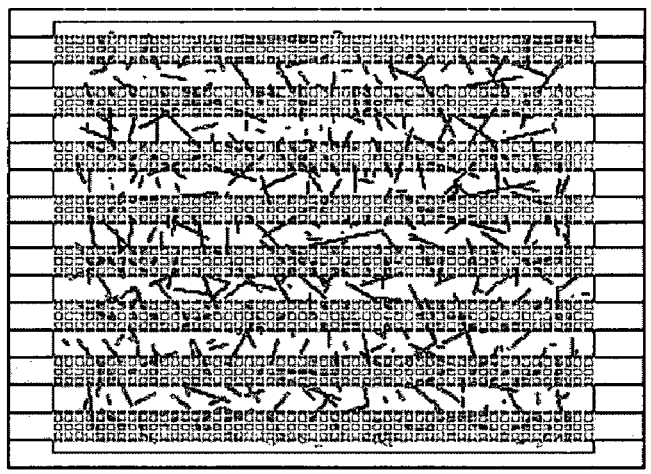
FIG. 9 is similar to FIG. 8, but showing the carbon nanotube layer after selected portions of the carbon nanotube layer and corresponding selected portions of the layer of conductive grease have been simultaneously scratched.

Referring to FIG. 9, the layer of conductive grease 202 and the carbon nanotube layer 203 are simultaneously scratched into a regular array of grids. Preferably, only that conductive grease 202 formed directly on the electrode pattern 201, together with the corresponding overlying carbon nanotube layer 203, are simultaneously scratched in this process.

Figure 10:
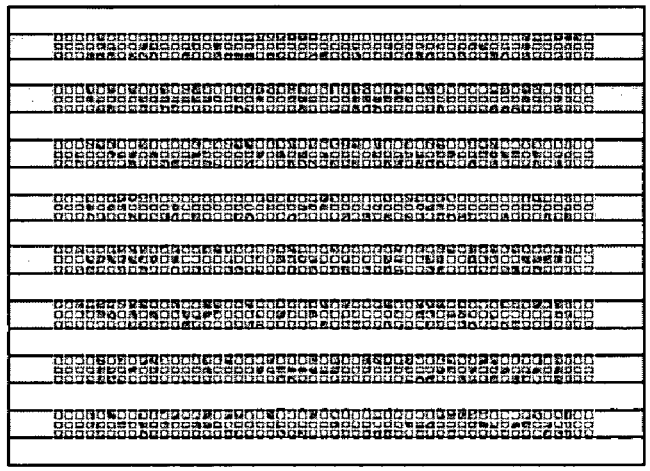
FIG. 10 is similar to FIG. 9, but showing a carbon nanotube layer pattern formed after selected portions of the carbon nanotube layer and corresponding selected portions of the layer of conductive grease have been wiped off.

Referring to FIG. 10, the conductive grease 202 formed directly on the base, together with the corresponding overlying carbon nanotubes, are wiped off. The conductive grease 202 formed directly on the electrode pattern 201, together with the corresponding overlying carbon nanotubes, remains. Thus each two adjacent electrode strips are separated by an insulating air gap therebetween.

Finally, the carbon nanotubes are then sintered to fasten their opposite second ends onto the conductive grease 202, thereby providing the carbon nanotube-based field emission cathode device that can be used in a flat panel display device.

Figure 11:
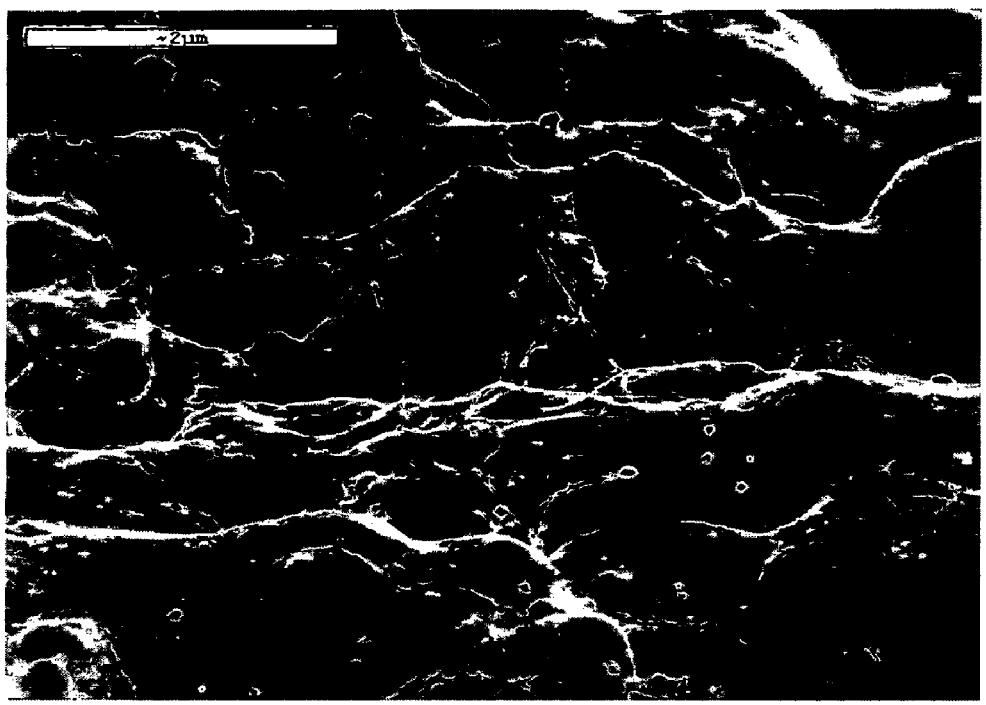
FIG. 11 is a scanning electron microscope (SEM) image of part of the carbon nanotube layer on the layer of conductive grease of FIG. 8.
Figure 12:
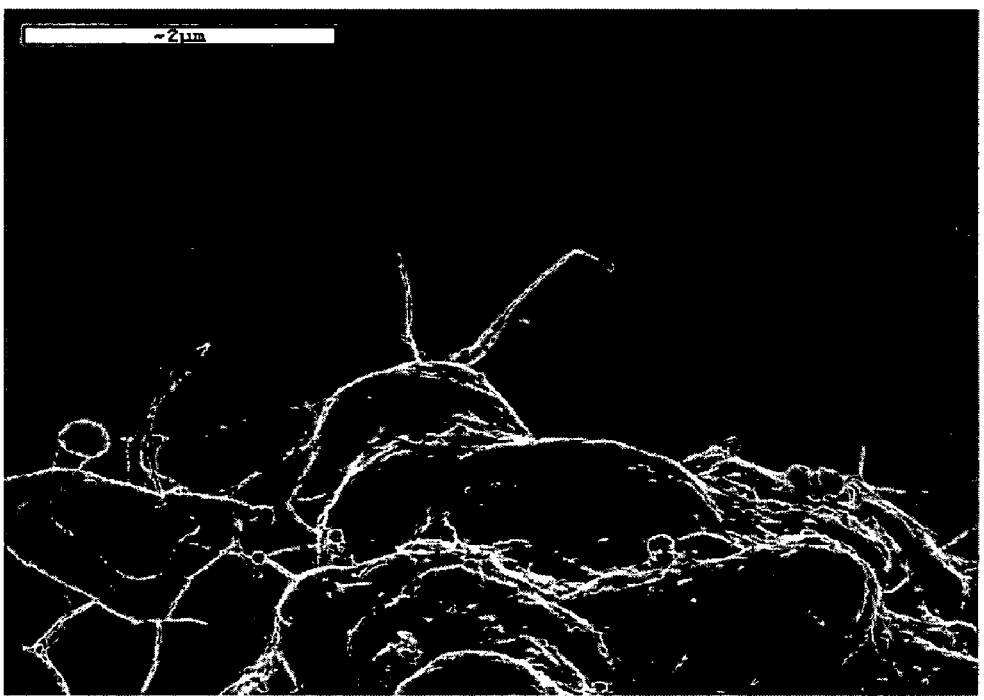
FIG. 12 is an SEM image of part of the carbon nanotube layer after the carbon nanotube layer and the layer of conductive grease have been scratched as per FIG. 9.

FIG. 11 is a scanning electron microscope (SEM) image of part of the carbon nanotube layer 203 on the layer of conductive grease 202, as described above in relation to FIG. 8. Almost all the carbon nanotubes lie flat on the layer of the conductive grease 202. FIG. 12 is an SEM image of part of the carbon nanotube layer 203 on the layer of conductive grease 202 after the carbon nanotube layer 203 and the layer of conductive grease 202 have been scratched, as described in relation to FIG. 9. First ends of many of the carbon nanotubes are suspended in air and are in relatively erect orientations. These carbon nanotubes function as effective field emitters.

Figure 13:
FIG. 13 is an image displayed by a diode structure field emission display which used the carbon nanotube-based field emission cathode device according to the second embodiment of the present invention.

The carbon nanotube-based field emission cathode device made according to the second embodiment is generally used in a diode structure or triode structure field emission display. FIG. 13 shows an image of "TFNRC" displayed by a diode structure field emission display.

It is understood that the invention may be embodied in other forms without departing from the spirit thereof. Thus, the present examples and embodiments are to be considered in all respects as illustrative and not restrictive, and the invention is not to be limited to the details given herein.

We claim:

1. A method for making a carbon nanotube-based field emission cathode device, comprising the steps of:
   dispersing a predetermined quantity of carbon nanotubes into a solvent, and achieving a solution;
   providing a base with en electrode formed thereon;
   forming a layer of conductive grease on the base;
   distributing the solution on the layer of conductive grease, and forming a carbon nanotube layer at least attached on the surface of the conductive grease after the solvent evaporates; and
   scratching the layer of conductive grease, thereby raising first ends of at least some of the carbon nanotubes from the conductive grease.

2. The method as described in claim 1, wherein the solvent is 1,2-chloric ethane.

3. The method as described in claim 1, wherein the carbon nanotubes are formed by an arc discharge method or a chemical vapor deposition method.

4. The method as described in claim 1, wherein the carbon nanotubes are dispersed into the solvent by ultrasonic vibration.

5. The method as described in claim 1, wherein the solution is distributed on the layer of conductive grease by a sprinkling process.

6. The method as described in claim 1, wherein the electrode is a metallic membrane overlaid on the base.

7. The method as described in claim 1, wherein the electrode is a pattern of a plurality of parallel metallic strips set on the base.

8. The method as described in claim 7, further comprising the step of wiping off the conductive grease formed directly on the base after the step of scratching.

9. The method as described in claim 1, wherein the base is made from an insulative material.

10. The method as described in claim 1, wherein the conductive grease comprises metal powder, glass powder, and an organic agglutinin.

11. The method as described in claim 1, further comprising the step of heating the base to evaporate the solvent at the same time as distributing the solution.

12. The method as described in claim 1, further comprising the step of sintering the carbon nanotubes thereby fastening the carbon nanotubes on the layer of conductive grease.

13. The method as described in claim 12, wherein the step of sintering is processed in a vacuum or an environment of argon or nitrogen gas, at a temperature of 350~600 degrees Centigrade for 20~60 minutes.

14. The method as described in claim 1, wherein the layer of conductive grease is scratched by a mechanical method.

15. A method for making a field emission cathode device, comprising the steps of:
   preparing a solution having a solvent with a quantity of carbon nanotubes dispersed therein;
   providing a base with an electrode formed thereon;
   forming a layer of conductive grease on said base;
   sprinkling said solution onto said layer of conductive grease whereby a carbon nanotube layer partly adhered on the surface of said layer of conductive grease is formed after said solvent evaporates; and
   scratching said layer of conductive grease with said carbon nanotube layer thereon thereby raising first ends of at least some of said carbon nanotubes in said scratched carbon nanotube layer.

16. The method as described in claim 15, wherein said layer of conductive grease is scratched by a mechanical method.

* * * * *